(12) United States Patent
Shimotoso et al.

(10) Patent No.: US 9,280,111 B2
(45) Date of Patent: Mar. 8, 2016

(54) IMAGE FORMING APPARATUS AND CHARGING MANAGEMENT SYSTEM

(71) Applicant: KONICA MINOLTA, INC., Chiyoda-ku, Tokyo (JP)

(72) Inventors: Osamu Shimotoso, Toyokawa (JP); Michio Takahashi, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/549,259

(22) Filed: Nov. 20, 2014

(65) Prior Publication Data

US 2015/0153674 A1 Jun. 4, 2015

(30) Foreign Application Priority Data

Nov. 30, 2013 (JP) ................................. 2013-248759

(51) Int. Cl.
*G03G 21/02* (2006.01)
*G03G 15/00* (2006.01)
*G06K 15/00* (2006.01)

(52) U.S. Cl.
CPC ................ *G03G 15/50* (2013.01); *G03G 21/02* (2013.01); *G06K 15/00* (2013.01)

(58) Field of Classification Search
CPC ........ G03G 21/02; G03G 15/50; G06K 15/00
USPC ...................................................... 399/79, 9
See application file for complete search history.

(56) References Cited

U.S. PATENT DOCUMENTS

2006/0078345 A1\* 4/2006 Lovat et al. ..................... 399/79
2007/0160378 A1 7/2007 Matsuda

FOREIGN PATENT DOCUMENTS

| JP | 2005088312 A | 4/2005 |
| JP | 2005196538 A | 7/2005 |
| JP | 2007185790 A | 7/2007 |

OTHER PUBLICATIONS

Machine translation of JP 2005-088312 (published on Apr. 7, 2005), printed on Jun. 9, 2015.\*
Japanese Office Action (and English translation thereof) dated Nov. 18, 2015, issued in counterpart Japanese Application No. 2013-248759.

\* cited by examiner

*Primary Examiner* — Sophia S Chen
(74) *Attorney, Agent, or Firm* — Holtz, Holtz & Volek PC

(57) ABSTRACT

An image forming apparatus includes: a sensor that detects discontinuation of printing or a decrease in print speed; and an electric circuit configured to set an available time to print according to an amount of advance payment; count a usage time during which the image forming apparatus is used; determine permission or prohibition of printing based on the available time to print and the usage time; determine whether to count the usage time based on a factor for the discontinuation of printing or the decrease in print speed when the sensor detects the discontinuation of printing or the decrease in print speed; and prohibit printing when the counted usage time reaches the available time to print.

12 Claims, 4 Drawing Sheets

IMAGE FORMING APPARATUS AND CHARGING MANAGEMENT SYSTEM

This application is based on Japanese Patent Application No. 2013-248759 filed on Nov. 30, 2013 the contents of which are hereby incorporated by reference.

BACKGROUND OF THE INVENTION

1. Field of the Invention

The present invention relates to an image forming apparatus and a charging management system, and more particularly relates to an image forming apparatus and a charging management system that adopt a time charging method.

2. Description of the Related Art

A copying machine that can be used by unspecified customers is set up in various types of stores such as a convenience store. A coin vendor or a prepaid card reading machine for charging is provided next to such a copying machine. A user previously pays the desired amount of money through the coin vendor or the prepaid card reading machine. Thus, it is possible to perform printing corresponding to the amount of money paid.

Since in such a number-of-sheet charging method, a charge is determined by the number of sheets printed, even when the same number of sheets are printed, a user who performs time-consuming printing increases the time during which the copying machine is occupied. Hence, for example, the subsequent user may give up the use of the copying machine because the user has been kept waiting for a long time. In this case, the manager who sets up the copying machine loses an opportunity to provide the copying machine.

On the other hand, there is a time charging method in which charging is performed according to the time during which the image forming apparatus is used. However, when charging is performed simply according to time, for example, a problem may occur in which the image forming apparatus does not operate as the user expects due to a paper jam or the like and thus the user is also charged for the time during which printing cannot be performed.

Hence, Japanese Unexamined Patent Application Publication No. 2005-88312 proposes a control configuration in which a detection unit that detects whether or not it is possible to satisfactorily perform printing processing is provided within an image forming apparatus and in which an actual usage time is measured based on the result of the detection.

SUMMARY OF THE INVENTION

With the control configuration proposed above, it is not necessary for a user to make an unreasonable payment. However, the state where printing processing cannot be performed may be caused by the user. The omission of such a case from the usage time of the user is unreasonable for the manager of the apparatus.

Hence, an object of the present invention is to provide an image forming apparatus of a time charging method that can charge a payment which is reasonable both for the user of the apparatus and for the manager thereof.

An image forming apparatus according to the present invention includes: a sensor that detects discontinuation of printing or a decrease in print speed; and an electric circuit configured to set an available time to print according to an amount of advance payment; count a usage time during which the image forming apparatus is used; determine permission or prohibition of printing based on the available time to print and the usage time; determine whether to count the usage time based on a factor for the discontinuation of printing or the decrease in print speed when the sensor detects the discontinuation of printing or the decrease in print speed; and prohibit printing when the counted usage time reaches the available time to print.

Here, preferably, the electric circuit uses, as a signal for start of the usage, at least one of a signal for turning on of a main power supply, a signal for usage application, a signal for authentication with a predetermined card, a signal for money insertion, a signal for pressing down of a printing start button, a signal for start or completion of image reading and a signal for start of a printing operation.

Preferably, the electric circuit does not count the usage time when the factor for the discontinuation of printing or the decrease in print speed is produced by the side of the apparatus whereas the electric circuit counts the usage time when the factor for the discontinuation of printing or the decrease in print speed is produced by the side of a user.

Here, preferably, the electric circuit lengthens an interval of counting of the usage time when the discontinuation of printing or the decrease in print speed is caused by the side of the user and the discontinuation of printing or the decrease in print speed includes a factor on the side of the apparatus.

A factor on a side of a user for the discontinuation of printing or the decrease in print speed to count the usage time is at least one of an instruction to stop the printing by the user, opening of a door, sheet empty, an error in specification of a sheet size and post-processing by a post-processing device.

On the other hand, a factor on a side of the apparatus for the discontinuation of printing or the decrease in print speed to fail to count the usage time is at least one of adjustment of a printing condition, adjustment of a fixing temperature, a cleaning operation, a paper jam and toner empty.

A charging management system according to the present invention includes: an image forming apparatus that includes: a sensor that detects discontinuation of printing or a decrease in print speed; and an electric circuit configured to set an available time to print according to an amount of advance payment; count a usage time during which the image forming apparatus is used; determine permission or prohibition of printing based on the available time to print and the usage time; determine whether to count the usage time based on a factor for the discontinuation of printing or the decrease in print speed when the sensor detects the discontinuation of printing or the decrease in print speed; and prohibit printing when the counted usage time reaches the available time to print; and a charging management device that is connected to the image forming apparatus such that the charging management device can communicate with the image forming apparatus and that calculates a usage charge based on the usage time.

Preferably, the electric circuit uses, as a signal for start of the usage, at least one of a signal for turning on of a main power supply, a signal for usage application, a signal for authentication with a predetermined card, a signal for money insertion, a signal for pressing down of a printing start button, a signal for start or completion of image reading and a signal for start of a printing operation.

Preferably, the electric circuit does not count the usage time when the factor for the discontinuation of printing or the decrease in print speed is produced by the side of the apparatus whereas the electric circuit counts the usage time when the factor for the discontinuation of printing or the decrease in print speed is produced by the side of a user.

Preferably, the electric circuit lengthens an interval of counting of the usage time when the discontinuation of printing or the decrease in print speed is caused by the side of the user and the discontinuation of printing or the decrease in print speed includes a factor on the side of the apparatus.

A factor on a side of a user for the discontinuation of printing or the decrease in print speed to count the usage time is at least one of an instruction to stop the printing by the user, opening of a door, sheet empty, an error in specification of a sheet size and post-processing by a post-processing device.

A factor on a side of the apparatus for the discontinuation of printing or the decrease in print speed to fail to count the usage time is at least one of adjustment of a printing condition, adjustment of a fixing temperature, a cleaning operation, a paper jam and toner empty.

DESCRIPTION OF PREFERRED EMBODIMENTS

Although the present invention will be described in further detail below using an embodiment, the present invention is not limited to this embodiment.

Figure 2:
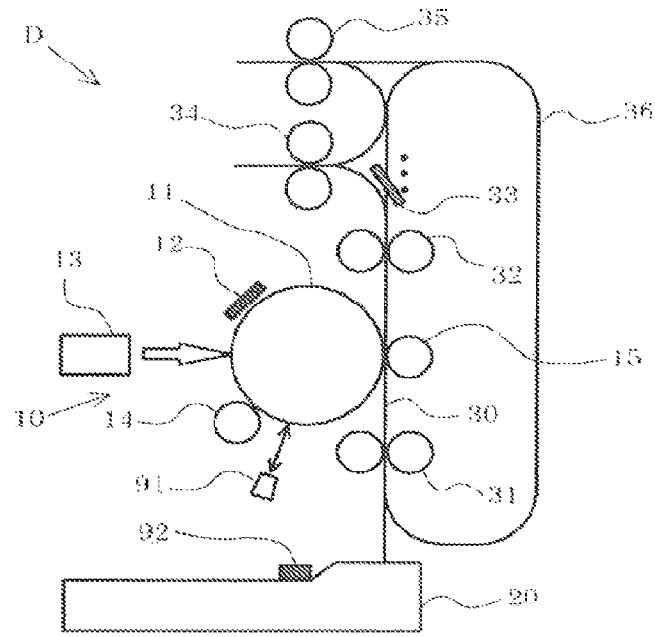
[FIG. 2] A basic structure diagram on image formation in an embodiment of the present invention.

FIG. 2 shows a basic configuration of an image forming apparatus D according to the present invention. An image forming unit 10 for forming an image includes a charging device 12, an exposure device 13, a development device 14 and a transfer roller 15 provided around a photosensitive member 11. A sheet that is drawn from a sheet tray 20 one by one and that is guided along a transport path 30 is transported, after the correction of its inclination by a resist roller 31, to a nip portion between the photosensitive member 11 and the transfer roller 15 with timing of the image forming unit 10. Then, the sheet is passed through a fixing device 32 and is ejected from a path switching gate 33 by an ejection roller 34 to the outside of the apparatus. In double-sided printing, a sheet whose front surface is printed is drawn from the path switching gate 33 to the ejection roller 34 or a reverse roller 35, and, immediately before the rear end of the sheet is passed through the nip portion of the ejection roller 34 or the nip portion of the reverse roller 35, the sheet is transported, by the reverse of the ejection roller 34 or the reverse roller 35, to a double-sided circulation path 36 and is transported again to the resist roller 31.

In the image forming unit 10, the outer circumferential surface of the rotated photosensitive member 11 is uniformly charged by the charging device 12. Then, laser light corresponding to image information is applied from the exposure device 13 to the surface of the charged photosensitive member 11 to form an electrostatic latent image. The exposure device 13 is formed with a laser and a polygon mirror for scanning the surface of the photosensitive member 11 with the laser light, and the polygon mirror is rotated by a polygon motor. The electrostatic latent image formed on the photosensitive member 11 is visualized on the surface of the photosensitive member 11 by toner supplied from the development device 14. This toner image is transferred, in the nip portion between the transfer roller 15 and the photosensitive member 11, to the sheet with a voltage applied to the transfer roller 15. Then, the sheet to which the toner image has been transferred is heated and pressurized by the fixing device 32, and thus the toner image is fused and fixed to the sheet.

Figure 3:
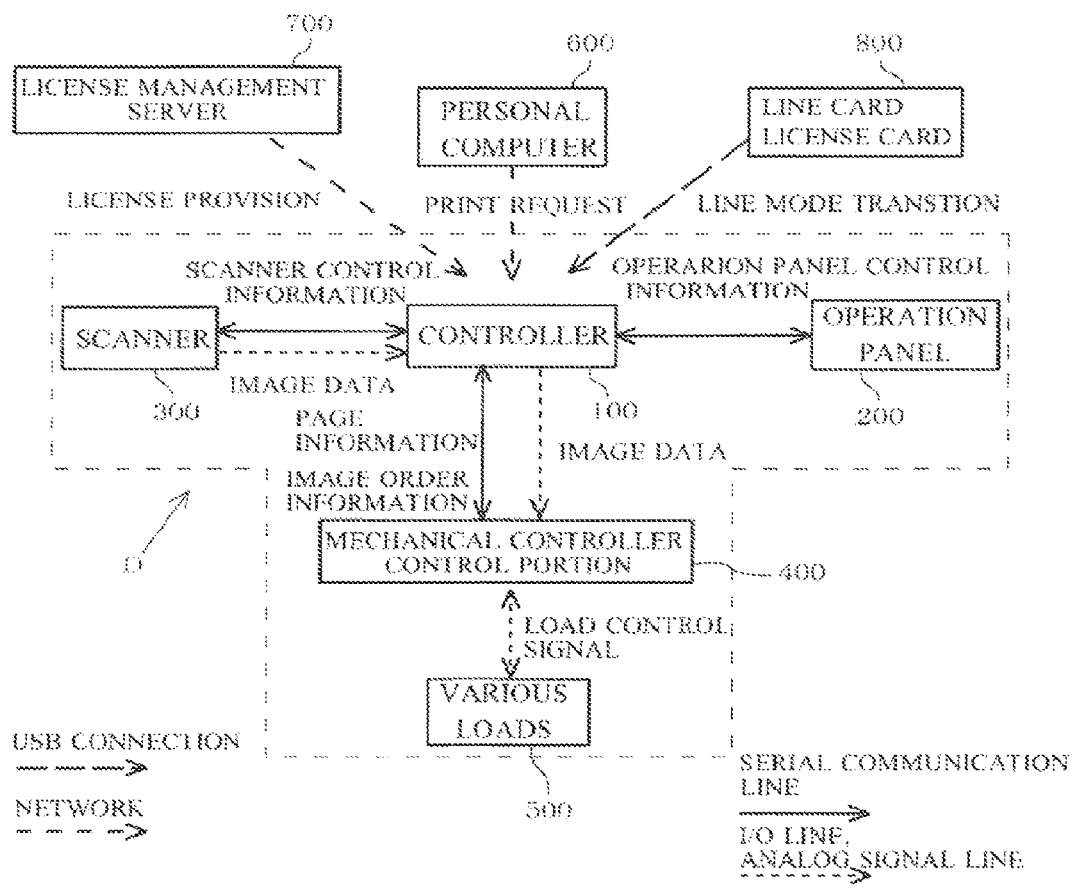
[FIG. 3] A control block diagram in the embodiment of the present invention.

In a control block diagram shown in FIG. 3, portions other than a personal computer 600, a license management server 700 and a line card 800 form the control portions of the image forming apparatus D. The blocks other than various types of loads 500 are an electric circuit board that is formed with a CPU, a ROM and a RAM and is connected through a network, a USB, serial communication, an I/O line and an analog signal line. Here, the various types of loads 500 mean various types of rollers in FIG. 2, the laser and the polygon motor of the exposure device 13, the heater of the fixing device 32, the solenoid of the path switching gate 33, the high-voltage power supply of the charging device 12 and the like.

A description will first be given of a case where printing is performed in a printer mode; the personal computer 600 first feeds a print request to a controller 100. The print request is issued in a page description language, and is formed with drawing information and page information (such as a sheet size and a color mode). When the controller 100 receives the print request, the controller 100 transmits the page information to a mechanical controller control portion 400. This page information is issued for each sheet. Each time the mechanical controller control portion 400 receives the page information, the mechanical controller control portion 400 feeds out one sheet.

A sheet ID is attached to the page information; in double-sided printing, the mechanical controller control portion 400 determines the number of sheets in double-sided printing according to the sheet size, and transmits image order information corresponding to the result thereof to the controller 100. For example, the image order information is only issued according to the number of pages in the order of, for example, sheet ID53=front→sheet ID54=front→sheet ID55=front→sheet ID53=back→sheet ID54=back→sheet ID55=back.

The controller 100 converts, according to the image order information, the drawing information included in the print request into image data undergoing bitmap development and stores it in the RAM, and outputs the image data to the mechanical controller control portion 400 in synchronization with a trigger signal from the mechanical controller control portion 400. This image data is printed to the sheet by the image forming unit 10 described above, and the sheet is transported to the outside of the apparatus.

In a case where printing is performed in a copying mode, the controller 100 transmits, according to operation panel control information from an operation panel 200, to a scanner 300, scanner control information for scanning an original document. The scanner 300 scans the original document according to the scanner control information, and outputs the image data to the controller 100. The controller 100 produces the page information while storing the image data in the RAM, and issues it to the mechanical controller control portion 400. The subsequent flow until printing is the same as in the printer mode described above.

Figure 1:
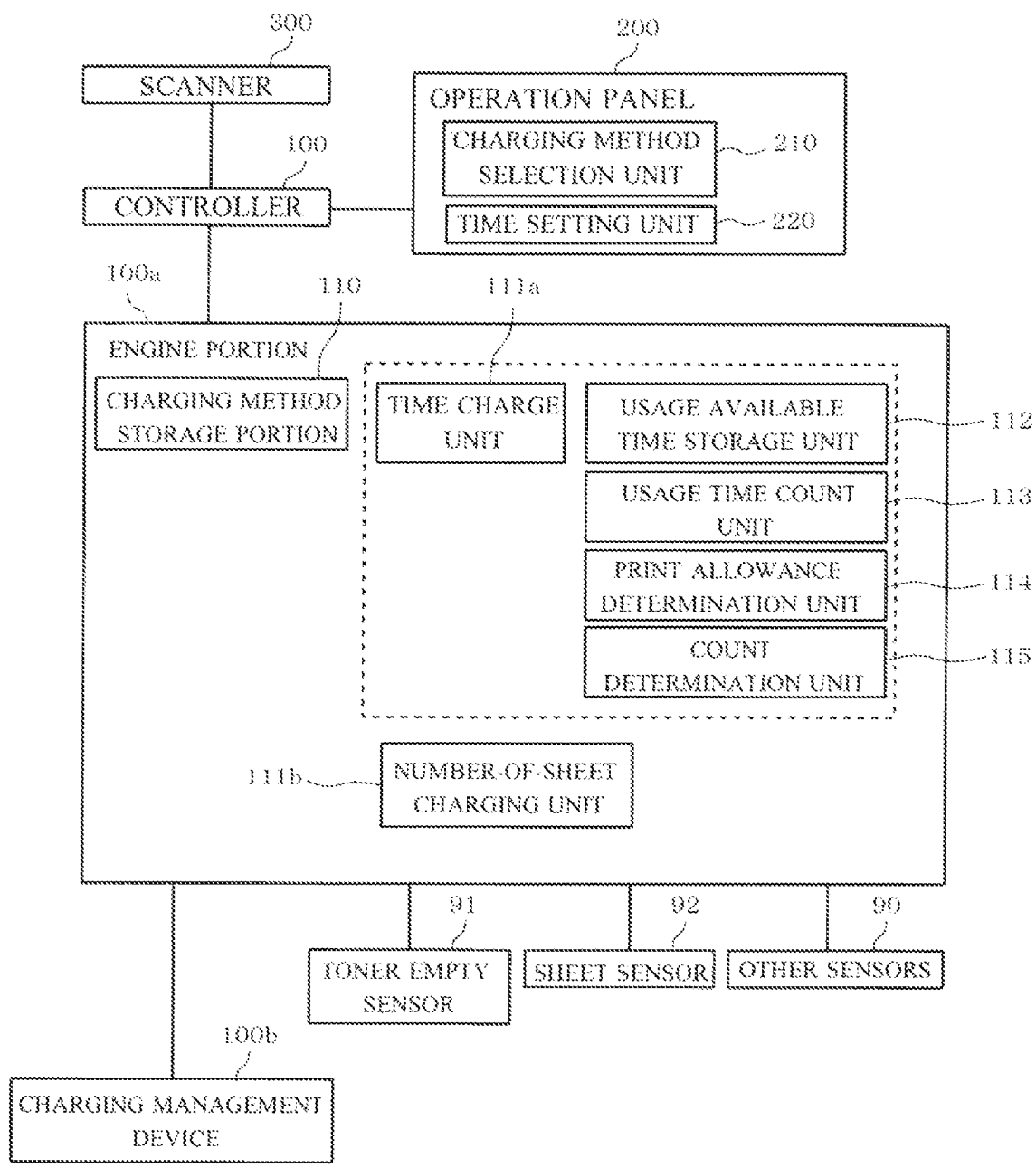
[FIG. 1] A control configuration diagram showing an example of an image forming apparatus according to the present invention.

A control configuration in a time charging method for determining a charge according to usage time will then be described with reference to FIG. 1. The main control elements are the scanner 300, the controller 100 that integrates and controls an engine portion (electric circuit) 100a and the scanner 300 and the operation panel 200 that receives an input operation. The engine portion 100a controls various types of processing conditions in the image formation and is part of the controller 100.

With respect to the operation panel 200, there are a case where a set-up manager receives a request from a user to operate the operation panel 200 and a case where the user actually performs the printing operation. Although in FIG. 1, the manager and the user perform the operation with the same operation panel, for example, a setting may be made such that the manager can perform the operation through a network line from a host personal computer.

The user can select the payment of a charge from two charging methods. Here, it is possible to select from a time charging method in which when a charge corresponding to a time is paid, printing can be performed within the print allowable time regardless of the number of sheets and a number-of-sheet charging method in which a charge for each sheet is fixed and when a charge corresponding to the number of sheets is paid, printing can be performed regardless of printing time. The manager enters a specific manager mode with the operation panel 200, and selects a charging method with a charging method selection unit 210 according to the intension of the user.

Here, when the time charging method is selected, the charging method storage portion 110 of the engine portion 100a stores the charging method, and a time charging unit 111a is started up. Then, when an available time is input according to the amount of advance payment from the time setting unit 220 of the operation panel 200, the available time to print is stored in a usage time storage unit 112. The operations described above are performed by the manager in the specific manager mode, and thereafter the manager mode is finished, and the subsequent operations are given over to the user. When the number-of-sheet charging method is selected, a number-of-sheet charging unit 111b is started up, and an unillustrated number-of-sheet setting unit sets the number of sheets to be printed.

The time charging unit 111a includes, in addition to the usage available time storage unit 112, a usage time count unit 113 that counts a usage time accumulated from the start of the usage, a print allowance determination unit 114 that determines, from the available time to print and the accumulated usage time, whether the printing operation is allowed or prohibited and a count determination unit 115 that determines, based on a factor for the discontinuation of the printing or a decrease in speed, whether or not to count the usage time.

Various types of sensors 90 such as a toner empty sensor 91 that detects the discontinuation of the printing or a decrease in speed and a sheet sensor 92 that detects a paper jam (paper jam sensor) are connected to the engine portion 100a. Based on signals from these sensors, the count determination unit 115 determines whether or not to count the usage time. A charging management device 100b is connected to the engine portion 100a, and a usage charge is calculated based on the usage time counted by the usage time count unit 113. The charging management device 100b may be provided separately from the image forming apparatus or may be incorporated in the image forming apparatus.

Figure 4:
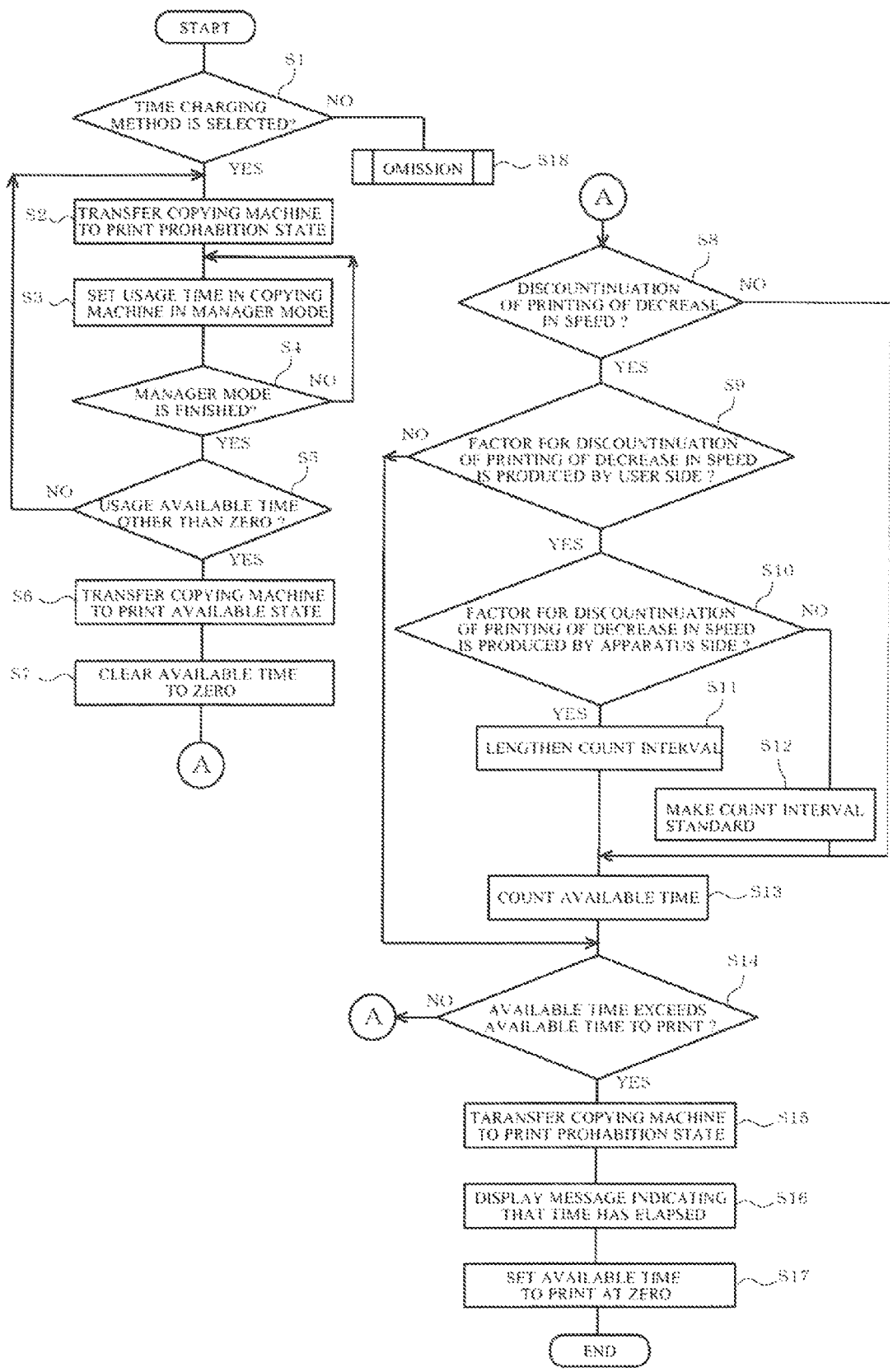
[FIG. 4] A control flow chart of a time charging method in the embodiment of the present invention.
Figure 5:
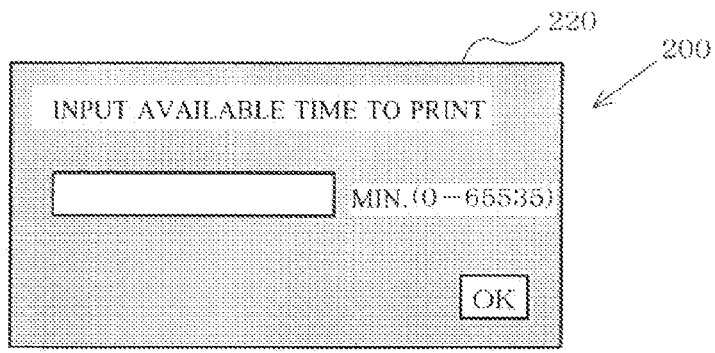
[FIG. 5] An example of the display of an operation panel that inputs an available time to print.

FIG. 4 shows a flow chart showing a procedure of usage and the details of control in the time charging method. When the user desires the time charging method and sets a usage time, in step S1, the manager enters the manager mode with the operation panel 200 and selects the time charging method with the charging method selection unit 210. Then, in step S2, the printing is temporarily prohibited. In step S3, since a screen formed by an available time input unit 220 as shown in FIG. 5 is displayed on the operation panel 200, the manager inputs an available time to print corresponding to the amount of advance payment. In the example of the display shown in FIG. 5, it is possible to set up to 65535 in minutes. When in step S4, the manager mode is finished, the available time is checked in step S5, and if the available time is not zero, printing can be performed in step S6. The determination of the available time described above is made by the print allowance determination unit 114.

Figure 6:
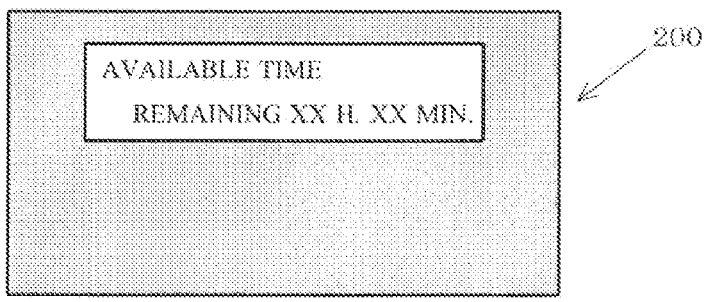
[FIG. 6] An example of the display of a display panel that shows the remaining available time.

Then, in step S7, the usage time of the usage time count unit 113 is cleared to zero. Thereafter, when at least one of a signal for the turning on of a main power supply, a signal for usage application, a signal for authentication with a predetermined card, a signal for money insertion, a signal for the pressing down of a printing start button, a signal for the start or the completion of image reading and a signal for the start of a printing operation is detected, the usage time count unit 113 starts the counting. Then, in step S8, whether the printing is discontinued or a decrease in speed is produced is determined. When the printing is not discontinued or a decrease in speed is not produced, in step S13, the usage time is counted every arbitrary control time (for example, one second). Then, on the operation panel 200, for example, the available time as shown in FIG. 6 is displayed.

Figure 7:
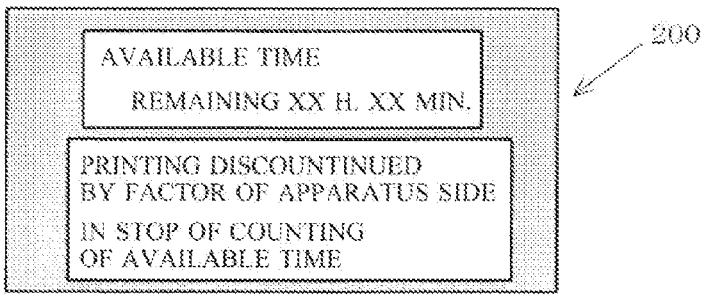
[FIG. 7] An example of the display of the display panel that shows the stop of the counting of the available time.

On the other hand, when in step S8, the printing is discontinued or a decrease in speed is produced, in step S9, a determination is then made as to whether or not a factor for the discontinuation of the printing or a decrease in speed is produced by the user side. When a factor for the discontinuation of the printing or a decrease in speed is not produced by the user side (step S9), that is, when a factor for the discontinuation of the printing or a decrease in speed is produced by the apparatus side, the usage time is not counted. Here, on the operation panel 200, for example, as shown in FIG. 7, information indicating that the usage time is not counted is displayed. When the discontinuation of the printing or a decrease in speed caused by a factor on the user side and the discontinuation of the printing or a decrease in speed caused by a factor on the apparatus side occur simultaneously, the counting of the usage time is stopped only while the discontinuation of the printing or a decrease in speed caused by a factor on the apparatus side is occurring.

When in step S9, the discontinuation of the printing or a decrease in speed caused by a factor on the user side occurs, in step S10, a determination is further made as to whether a factor for the discontinuation of the printing or a decrease in speed is also produced by the apparatus side. Then, when a factor for the discontinuation of the printing or a decrease in speed is also produced by the apparatus side, in step S11, the interval of the counting of the usage time by the usage time count unit is lengthened. On the other hand, when a factor for the discontinuation of the printing or a decrease in speed is not produced by the apparatus side, in step S12, the interval of the counting of the usage time is made standard. Then, in step S13, the usage time is counted.

When the discontinuation of the printing or a decrease in speed occurs, whether or not the usage time is counted is determined by the count determination unit 115. Specifically, a classification table that determines, for each cause of the discontinuation of the printing or a decrease in speed, whether it is produced by the user or the apparatus is previously input and stored in the storage unit. Then, when the discontinuation of the printing or a decrease in speed is detected by the detection unit, the count determination unit 115 determines whether it is caused by the user or the apparatus based on the classification table, and determines whether or not the usage time is counted. Table 1 is an example of a classification table of causes of the discontinuation of the printing, and table 2 is an example of a classification table of causes of a decrease in speed.

TABLE 1

| Causes of discontinuation of printing | Factor on user side or apparatus side |
| --- | --- |
| Printing stop instruction | user side |
| Door Opening | user side |
| Sheet empty | user side |
| Error in sheet size | user side |
| Warm up | apparatus side |
| Adjustment of printing conditions | apparatus side |
| Adjustment of fixing temperature | apparatus side |
| Cleaning operation | apparatus side |
| Paper jam | apparatus side |
| Toner empty | apparatus side |
| Initiation of printing operation by paper feed port switching | user side |
| Toner supply | apparatus side |
| Rotation stability of polygon mirror | apparatus side |

TABLE 2

| Causes of decrease in printing speed | Factor on user side or apparatus side |
| --- | --- |
| Post-processing by post-processing device | user side |
| Double-sided printing | user side |
| Transfer operation by paper feed cassette | apparatus side |
| Delay of reading of image data | user side |
| Delay of communication on network line | user side |

Figure 8:
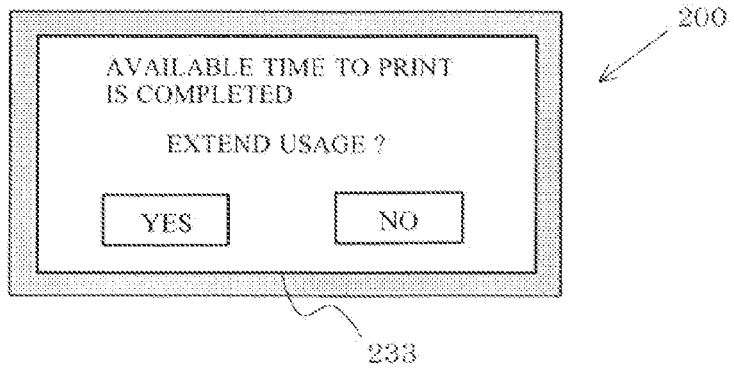
[FIG. 8] An example of the display of the display panel that shows the completion of the available time to print.

Then, in step S14, whether or not the usage time exceeds the available time to print is determined by the print allowance determination unit 114. Since the available time to print is set in minutes, the usage time of the usage time count unit 113 is converted into minutes. When in step S14, the print allowance determination unit 114 determines that the usage time exceeds the available time to print, in step S15, the copying machine is brought into the state where printing is prohibited. Then, in step S16, information indicating that the available time to print is completed is displayed on the operation panel 200. FIG. 8 shows an example of a completion message 233 displayed on the operation panel 200. Then, in step S17, the available time to print is set at zero, and the control is completed. When in step S1, the time charging method is not selected, the process is moved to step S18, and for example, control by the number-of-sheet charging method is performed.

In the example of the control described above, the method of counting the usage time may be an increment method or may be a decrement method.

As described above, when in the image forming apparatus of the present invention, the time charging method in which the charge is determined by the usage time is selected, and the discontinuation of the printing or a decrease in speed occurs, whether or not the usage time is counted is determined based on its factor. In this way, a payment is charged which is reasonable both for the user of the apparatus and for the manager thereof.

What is claimed is:

1. An image forming apparatus comprising:
  a sensor that detects discontinuation of printing or a decrease in print speed; and
  an electric circuit configured to:
    set an available time to print according to an amount of advance payment;
    count a usage time during which the image forming apparatus is used;
    determine permission or prohibition of printing based on the available time to print and the usage time;
    determine whether or not to count the usage time based on whether a factor for the discontinuation of printing or the decrease in print speed is produced by a side of the apparatus or a side of a user, when the sensor detects the discontinuation of printing or the decrease in print speed; and
    prohibit printing when the counted usage time reaches the available time to print.

2. The image forming apparatus according to claim 1, wherein the electric circuit uses, as a signal for a start of the usage, at least one of a signal for turning on of a main power supply, a signal for a usage application, a signal for authentication with a predetermined card, a signal for money insertion, a signal for pressing down of a printing start button, a signal for start or completion of image reading, and a signal for a start of a printing operation.

3. The image forming apparatus according to claim 1, wherein the electric circuit does not count the usage time when the factor for the discontinuation of printing or the decrease in print speed is produced by the side of the apparatus whereas the electric circuit counts the usage time when the factor for the discontinuation of printing or the decrease in print speed is produced by the side of the user.

4. The image forming apparatus according to claim 1, wherein the factor on the side of the user for the discontinuation of printing or the decrease in print speed, which is used to determine to count the usage time, is at least one of an instruction to stop the printing by the user, opening of a door, a sheet empty state, an error in specification of a sheet size, and performing of post-processing by a post-processing device.

5. The image forming apparatus according to claim 1, wherein the factor on the side of the apparatus for the discontinuation of printing or the decrease in print speed, which is used to determine to not count the usage time, is at least one of an adjustment of a printing condition, an adjustment of a fixing temperature, a cleaning operation, occurrence of a paper jam, and a toner empty state.

6. An image forming apparatus comprising:
  a sensor that detects discontinuation of printing or a decrease in print speed; and
  an electric circuit configured to:
    set an available time to print according to an amount of advance payment;
    count a usage time during which the image forming apparatus is used;
    determine permission or prohibition of printing based on the available time to print and the usage time;
    determine whether to count the usage time based on a factor for the discontinuation of printing or the decrease in print speed when the sensor detects the discontinuation of printing or the decrease in print speed; and
    prohibit printing when the counted usage time reaches the available time to print, wherein the electric circuit does not count the usage time when the factor for the discontinuation of printing or the decrease in print speed is produced by a side of the apparatus whereas the electric circuit counts the usage time when the factor for the discontinuation of printing or the decrease in print speed is produced by a side of a user, and wherein the electric circuit lengthens an interval of counting of the usage time when the discontinuation of printing or the decrease in print speed is caused by the side of the user and the discontinuation of printing or the decrease in print speed includes a factor on the side of the apparatus.

7. A charging management system comprising:
an image forming apparatus that includes:
   a sensor that detects discontinuation of printing or a decrease in print speed; and
   an electric circuit configured to:
   set an available time to print according to an amount of advance payment;
   count a usage time during which the image forming apparatus is used;
   determine permission or prohibition of printing based on the available time to print and the usage time;
   determine whether or not to count the usage time based on whether a factor for the discontinuation of printing or the decrease in print speed is produced by a side of the apparatus or a side of a user, when the sensor detects the discontinuation of printing or the decrease in print speed; and
   prohibit printing when the counted usage time reaches the available time to print; and
a charging management device that is connected to the image forming apparatus such that the charging management device can communicate with the image forming apparatus and that calculates a usage charge based on the usage time.

8. The charging management system according to claim 7, wherein the electric circuit uses, as a signal for a start of the usage, at least one of a signal for turning on of a main power supply, a signal for a usage application, a signal for authentication with a predetermined card, a signal for money insertion, a signal for pressing down of a printing start button, a signal for start or completion of image reading, and a signal for a start of a printing operation.

9. The charging management system according to claim 7, wherein the electric circuit does not count the usage time when the factor for the discontinuation of printing or the decrease in print speed is produced by the side of the apparatus whereas the electric circuit counts the usage time when the factor for the discontinuation of printing or the decrease in print speed is produced by the side of the user.

10. The charging management system according to claim 7, wherein the factor on the side of the user for the discontinuation of printing or the decrease in print speed, which is used to determine to count the usage time, is at least one of an instruction to stop the printing by the user, opening of a door, a sheet empty state, an error in specification of a sheet size, and performing of post-processing by a post-processing device.

11. The charging management system according to claim 7, wherein the factor on the side of the apparatus for the discontinuation of printing or the decrease in print speed, which is used to determine to not count the usage time, is at least one of an adjustment of a printing condition, an adjustment of a fixing temperature, a cleaning operation, occurrence of a paper jam, and a toner empty state.

12. A charging management system comprising:
an image forming apparatus that includes:
   a sensor that detects discontinuation of printing or a decrease in print speed; and
   an electric circuit configured to:
   set an available time to print according to an amount of advance payment;
   count a usage time during which the image forming apparatus is used;
   determine permission or prohibition of printing based on the available time to print and the usage time;
   determine whether to count the usage time based on a factor for the discontinuation of printing or the decrease in print speed when the sensor detects the discontinuation of printing or the decrease in print speed; and
   prohibit printing when the counted usage time reaches the available time to print; and
a charging management device that is connected to the image forming apparatus such that the charging management device can communicate with the image forming apparatus and that calculates a usage charge based on the usage time, wherein the electric circuit does not count the usage time when the factor for the discontinuation of printing or the decrease in print speed is produced by a side of the apparatus whereas the electric circuit counts the usage time when the factor for the discontinuation of printing or the decrease in print speed is produced by a side of a user, and wherein the electric circuit lengthens an interval of counting of the usage time when the discontinuation of printing or the decrease in print speed is caused by the side of the user and the discontinuation of printing or the decrease in print speed includes a factor on the side of the apparatus.

* * * * *